US009162585B2

(12) United States Patent
Hanna (10) Patent No.: US 9,162,585 B2
(45) Date of Patent: Oct. 20, 2015

(54) RECHARGEABLE ENERGY STORAGE SYSTEM MANAGEMENT FOR VEHICLES (71) Applicant: GM GLOBAL TECHNOLOGY OPERATIONS LLC, Detroit, MI (US)

(72) Inventor: Ian L. Hanna, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/159,938

(22) Filed: Jan. 21, 2014

(65) Prior Publication Data
US 2015/0202980 A1    Jul. 23, 2015

(51) Int. Cl.
*B60L 11/00* (2006.01)
*B60L 11/18* (2006.01)

(52) U.S. Cl.
CPC ......... *B60L 11/1861* (2013.01); *B60L 11/1875* (2013.01)

(58) Field of Classification Search
CPC .............. B60L 11/197; B60L 11/1851; B60L 11/1861; B60L 11/1862; B60L 2240/62; B60L 2240/455; B60L 15/2045; B60L 2250/10; B60L 2260/56; Y02T 10/7005; Y02T 10/6269; Y02T 10/705; Y02T 10/7044; Y02T 10/7291; Y02T 10/2291; Y02T 10/7283; Y02T 90/14; Y02T 90/162; Y02T 90/161; Y02T 90/168; B60W 20/00; B60W 20/102; B60W 10/26; B60W 10/08; B60W 2550/402; B60W 4710/244; B60W 2510/244; B60R 16/0236; Y10S 903/903
USPC ........... 701/22, 123, 408, 423, 400, 439, 527; 180/65.29; 903/903; 340/455
See application file for complete search history.

(56) References Cited

U.S. PATENT DOCUMENTS

| | | | |
|---|---|---|---|
| 2009/0114463 A1* | 5/2009 | DeVault | 180/65.29 |
| 2010/0007481 A1* | 1/2010 | Uchida | 340/455 |
| 2010/0138142 A1* | 6/2010 | Pease | 701/123 |
| 2010/0212338 A1* | 8/2010 | Hermann et al. | 62/118 |
| 2011/0082621 A1* | 4/2011 | Berkobin et al. | 701/33 |
| 2013/0204456 A1* | 8/2013 | Tippelhofer et al. | 701/1 |

* cited by examiner

*Primary Examiner* — Marthe Marc-Coleman
(74) *Attorney, Agent, or Firm* — Ingrassia Fisher & Lorenz, P.C.

(57) ABSTRACT

Methods and systems are provided for vehicles having a rechargeable energy storage system (RESS). A first sensor is configured to measure an ambient temperature for the vehicle. A second sensor is configured to measure a temperature of the RESS. The processor is coupled to the first sensor and the second sensor, and is configured to at least facilitate taking an action based on an expected degradation of the RESS after vehicle key-off based at least in part on the ambient temperature and the RESS temperature.

20 Claims, 4 Drawing Sheets

RECHARGEABLE ENERGY STORAGE SYSTEM MANAGEMENT FOR VEHICLES

TECHNICAL FIELD

The present disclosure generally relates to the field of vehicles and, more specifically, to methods and systems for management of rechargeable energy storage systems for vehicles, such as automobiles.

BACKGROUND

Many vehicles today, including battery electric vehicles, include rechargeable energy storage systems (RESS) (for example, high voltage vehicle batteries) that provide energy for propulsion of the vehicle. However, an RESS can be affected by environmental temperatures after vehicle key-off. For example, the RESS may experience degradation after prolonged exposure to extreme cold temperatures.

Accordingly, it is desirable to provide improved methods and systems for managing RESS for vehicles, for example with respect to possible degradation from environmental temperatures. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining an ambient temperature for a vehicle having a rechargeable energy storage system (RESS), obtaining a temperature of the RESS, and taking an action based on an expected degradation of the RESS after vehicle key-off based at least in part on the ambient temperature and the RESS temperature.

In accordance with another exemplary embodiment, a system is provided. The system comprises a first sensor, a second sensor, and a processor. The first sensor is configured to measure an ambient temperature for a vehicle having a rechargeable energy storage system (RESS). The second sensor is configured to measure a temperature of the RESS. The processor is coupled to the first sensor and the second sensor, and is configured to at least facilitate taking an action based on an expected degradation of the RESS after vehicle key-off based at least in part on the ambient temperature and the RESS temperature.

In accordance with a further exemplary embodiment, a vehicle is provided. The vehicle includes a drive system and a control system. The drive system comprises a rechargeable energy storage system (RESS). The control system comprises a first sensor, a second sensor, and a processor. The first sensor is configured to measure an ambient temperature for the vehicle. The second sensor is configured to measure a temperature of the RESS. The processor is coupled to the first sensor and the second sensor, and is configured to at least facilitate taking an action based on an expected degradation of the RESS after vehicle key-off based at least in part on the ambient temperature and the RESS temperature.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
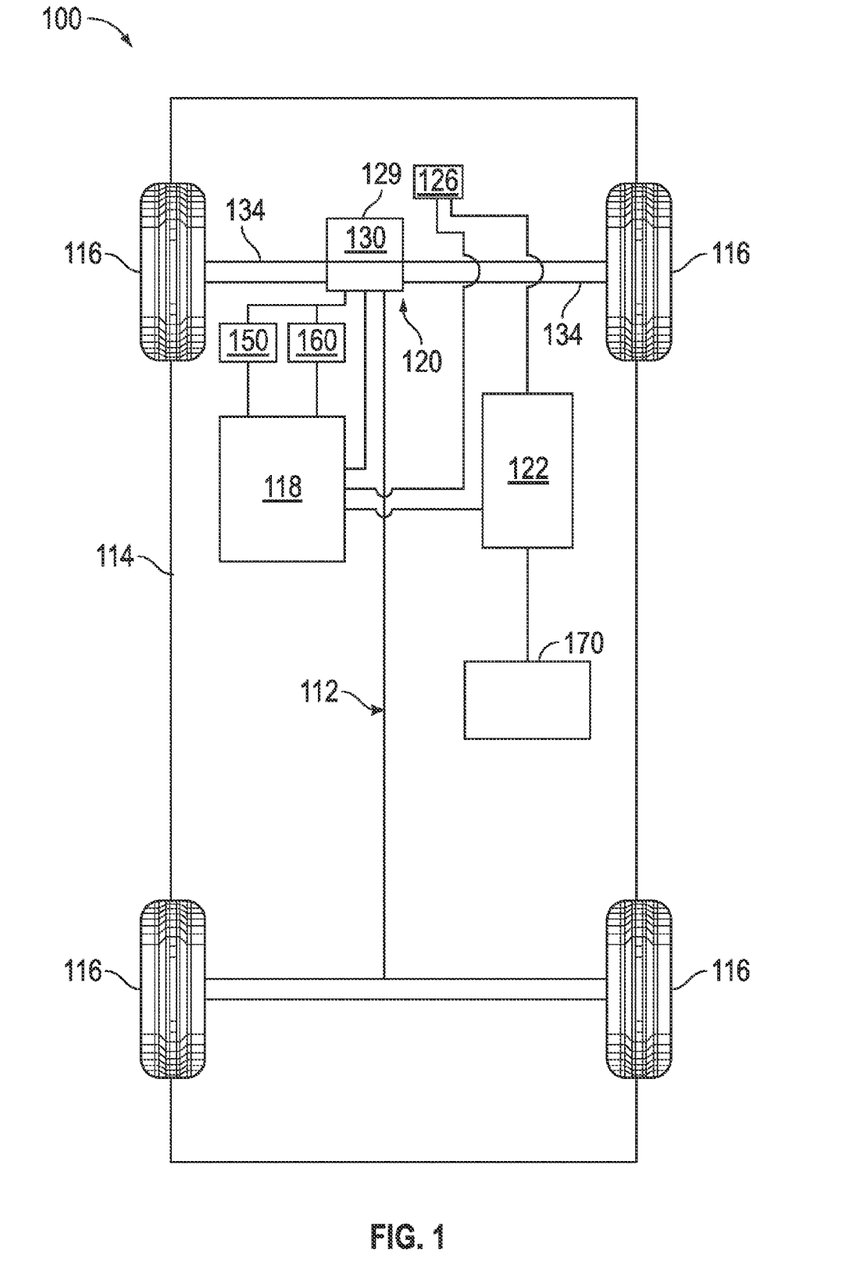
FIG. 1 is a functional block diagram of a vehicle that includes a rechargeable energy storage system (RESS) and a control system for managing the RESS.

FIG. 1 illustrates a vehicle 100, or automobile, according to an exemplary embodiment. The vehicle 100 is also referenced at various points throughout this Application as the vehicle. As described in greater detail further below, the vehicle 100 includes a rechargeable energy storage system (RESS) 122 (e.g., a high voltage vehicle battery) and a control system 170 for managing the RESS 122, including management of possible degradation during extreme temperatures when the vehicle 100 is keyed off.

As depicted in FIG. 1, the vehicle 100 includes a chassis 112, a body 114, four wheels 116, an electronic control system 118, a steering system 150, a braking system 160, and the above-referenced control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 is a battery electric vehicle, and further includes a drive system comprising an actuator assembly 120, the above-referenced RESS 122, and a power inverter assembly (or inverter) 126. The actuator assembly 120 includes at least one electric propulsion system 129 mounted on the chassis 112 that drives the wheels 116. In the depicted embodiment, the actuator assembly 120 includes an electric motor/generator (or motor) 130 that is powered by the RESS 122. As will be appreciated by one skilled in the art, the electric motor 130 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 130 may include multiple electromagnetic poles, as is commonly understood.

Still referring to FIG. 1, the electric motor 130 is integrated such that it is mechanically coupled to at least some of the wheels 116 through one or more drive shafts 134. As mentioned above, in the depicted embodiment, the vehicle 100 comprises a battery electric vehicle. In certain other embodiments, the vehicle 100 may comprise a hybrid electric vehicle (HEV) that has a combustion engine (not depicted) along with the electric motor 130. In such other embodiments, the vehicle 100 may comprise a "series HEV" (in which a combustion engine is not directly coupled to the transmission, but coupled to a generator which is used to power the electric motor 130) or a "parallel HEV" (in which a combustion engine is directly coupled to the transmission by, for example, having the rotor of the electric motor 130 rotationally coupled to the drive shaft of the combustion engine).

The RESS 122 is mounted on the chassis 112, and is electrically connected to the inverter 126. The RESS 122 preferably comprises a battery having a pack of battery cells. In one embodiment, the RESS 122 comprises a lithium iron phosphate battery, such as a nanophosphate lithium ion battery. Together the RESS 122 and electric propulsion system(s) 129 provide a drive system to propel the vehicle 100.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, inputs via a cruise control resume switch (not depicted), and various other inputs for various vehicle devices and/or systems, such as one or more vehicle radios, other entertainment systems, environmental control systems, lightning units, navigation systems, and the like (also not depicted). In a preferred embodiment, the braking system 160 includes both a regenerative braking capability and a friction braking capability for the vehicle 100.

The control system 170 is mounted on the chassis 112, and is coupled to the RESS 122. The control system 170 controls and manages operation of the RESS 122, including management of degradation from extreme temperatures during vehicle key-off, in accordance with the steps of the process 300 depicted in FIG. 3 and described below in connection therewith. The control system 170 may also be coupled to various other vehicle devices and systems, such as, among others, the actuator assembly 120, the steering system 150, the braking system 160, and the electronic control system 118.

Figure 2:
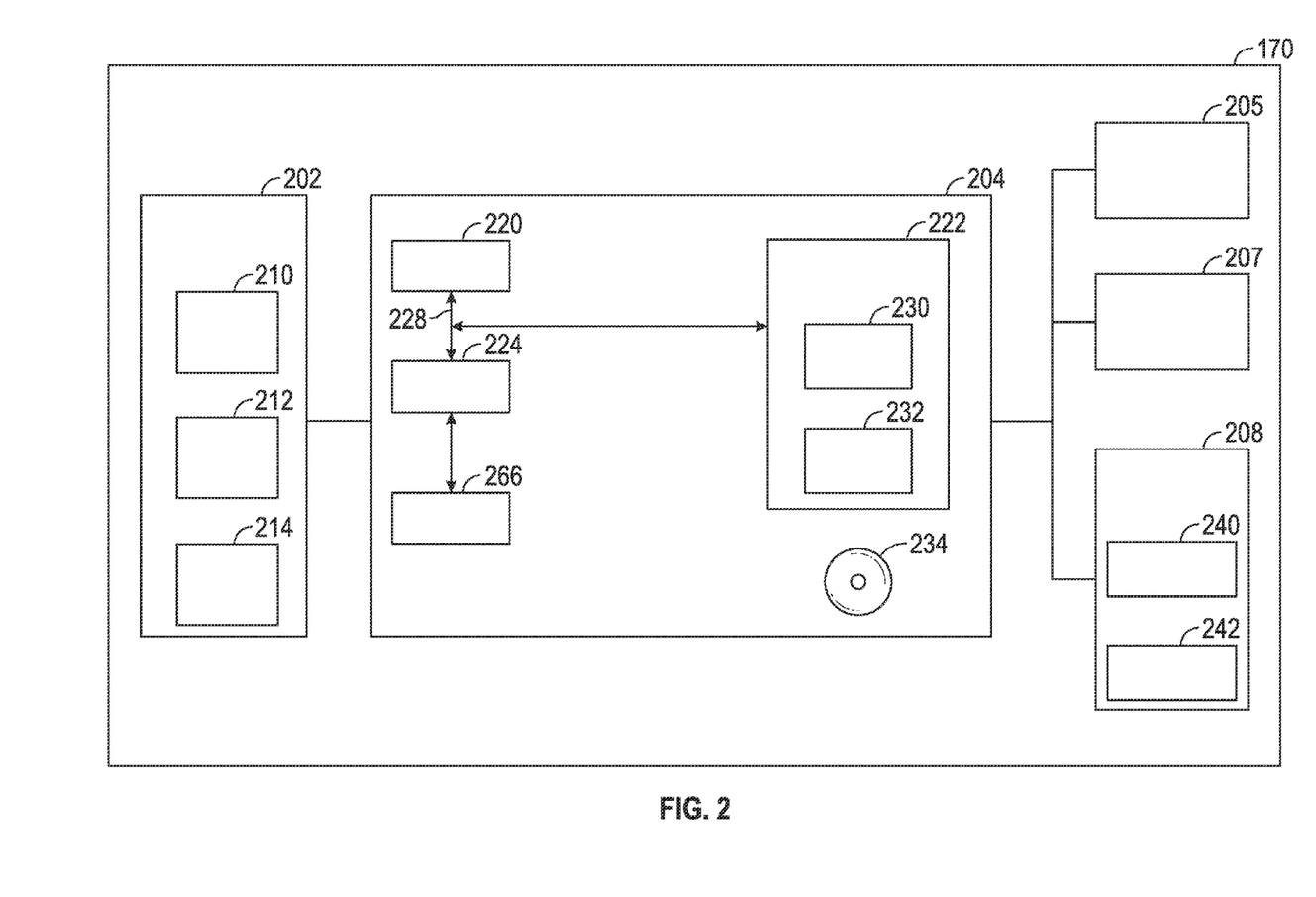
FIG. 2 is a functional block diagram of the control system of FIG. 1, in accordance with an exemplary embodiment.

With reference to FIG. 2, a functional block diagram is provided for the control system 170, in accordance with an exemplary embodiment. As depicted in FIG. 2, the control system 170 includes a sensor array 202, a transceiver 205, a user interface 207, a notification unit 208, and a controller 209.

The sensor array 202 measures and obtains information for use by the controller 209 for management of the RESS 122 of FIG. 1. As depicted in FIG. 2, the sensor array 202 includes an ambient temperature sensor 210, an RESS temperature sensor 212, and a solar load sensor 214.

The ambient temperature sensor 210 measures an ambient temperature for the vehicle, preferably an ambient temperature just outside the vehicle. In one embodiment, the ambient temperature sensor 210 is disposed within or just inside a front hood of the vehicle 100 of FIG. 1.

The RESS temperature sensor 212 measures a temperature of the RESS, preferably a temperature inside the RESS 122 of FIG. 1. In one embodiment, the RESS temperature sensor 212 is disposed within the RESS 122 of FIG. 1.

The solar load sensor 214 measures a solar load of the vehicle (for example, an amount of sunlight in contact with the vehicle, which may be indicative of whether the vehicle is outside or instead inside such as in a garage, and so on. In one embodiment, the solar load sensor 214 is disposed on a rooftop of the vehicle 100 of FIG. 1.

The transceiver 205 provides communications for the controller 209. In one embodiment, the transceiver 205 receives information, such as geographic information pertaining to a location of the vehicle and weather reports for the geographic location, for use by the controller 209 in managing the RESS 122 of FIG. 1. In addition, in one embodiment, the transceiver 205 is used by the controller 209 for communicating alerts to a driver of the vehicle pertaining to management of the RESS. It will be appreciated that in various embodiments the transceiver 205 may operate in conjunction with one or more antennas (not depicted) of the vehicle, wired and/or wireless networks, satellites and global positioning system (GPS) devices, third party providers of content (e.g., weather information), and so on.

The user interface 207 is used by the controller 209 to communicate with a driver of the vehicle. In certain embodiments, the user interface 207 is used to obtain inputs from the driver (or another occupant of the vehicle), for example pertaining to a time in which the driver expects the next vehicle drive to begin (e.g., when the vehicle will be keyed on again and driven in a propulsion mode), a destination for the next vehicle drive, and any preferences and/or other inputs that the driver (or other vehicle occupant) may have, for example pertaining to preferred types of alerts and/or actions for managing the RESS 122 of FIG. 2. In various embodiments the user interface 207 may include, by way of example, a touch screen interface in the vehicle (e.g., on or near the dash board), knobs dials, voice recognition equipment, and/or various other interface devices.

The notification unit 208 is used to provide alerts to the driver and/or other occupants of the vehicle, including alerts pertaining to possible degradation of the RESS 122 of FIG. 1. As depicted in FIG. 2, the notification unit 208 includes an audio component 240 (e.g., with a speaker for delivering audio alerts) and a visual component 242 (e.g., with a display screen for delivering visual alerts). In one embodiment, the notification unit 208 is disposed on a front portion of the interior cabin of the vehicle, for example on or near the vehicle dashboard. In certain embodiments the notification unit 208 may be part of the user interface 207.

The controller 209 is coupled to the sensor array 202 as well as to the transceiver 205, user interface 207, and the notification unit 208. The controller 209 manages the RESS 122 of FIG. 1, including with respect to management of temperature degradation during vehicle key-off in which extreme temperatures are present. The controller receives information from the sensor array 202, the transceiver 205, and the user interface 207, processes this information, provides alerts as appropriate to the driver based at least in part on this information via the transceiver 205 and/or notification unit 208, and also controls a temperature of the RESS 122 of FIG. 1 as appropriate based on this information, in accordance with the steps of the process 300 depicted in FIG. 3 and described below in connection therewith.

As depicted in FIG. 2, the controller 209 comprises a computer system. In certain embodiments, the controller 209 may also include one or more of the sensors of the sensor array 202 and/or one or more of the transceiver 205, user interface 207, and/or notification unit 208 of FIG. 2. In addition, it will be appreciated that the controller 209 may otherwise differ from the embodiment depicted in FIG. 2. For example, the controller 209 may be coupled to or may otherwise utilize one or more remote computer systems and/or other control systems.

In the depicted embodiment, the computer system of the controller 209 includes a processor 220, a memory 222, an interface 224, a storage device 226, and a bus 228. The processor 220 performs the computation and control functions of the controller 209, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 209 and the computer system of the controller 209, preferably in executing the steps of the processes described herein, such as the steps of the process 300 (and any sub-processes thereof) in connection with FIG. 3.

The memory 222 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (preferably, including look-up tables) for use in associating the measurements from the sensor array 202.

The bus 228 serves to transmit programs, data, status and other information or signals between the various components of the computer system of the controller 209. The interface 224 allows communication to the computer system of the controller 209, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 300 (and any sub-processes thereof) of FIG. 3, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 209 may also otherwise differ from the embodiment depicted in FIG. 2, for example in that the computer system of the controller 209 may be coupled to or may otherwise utilize one or more remote computer systems and/or other control systems.

Figure 3:
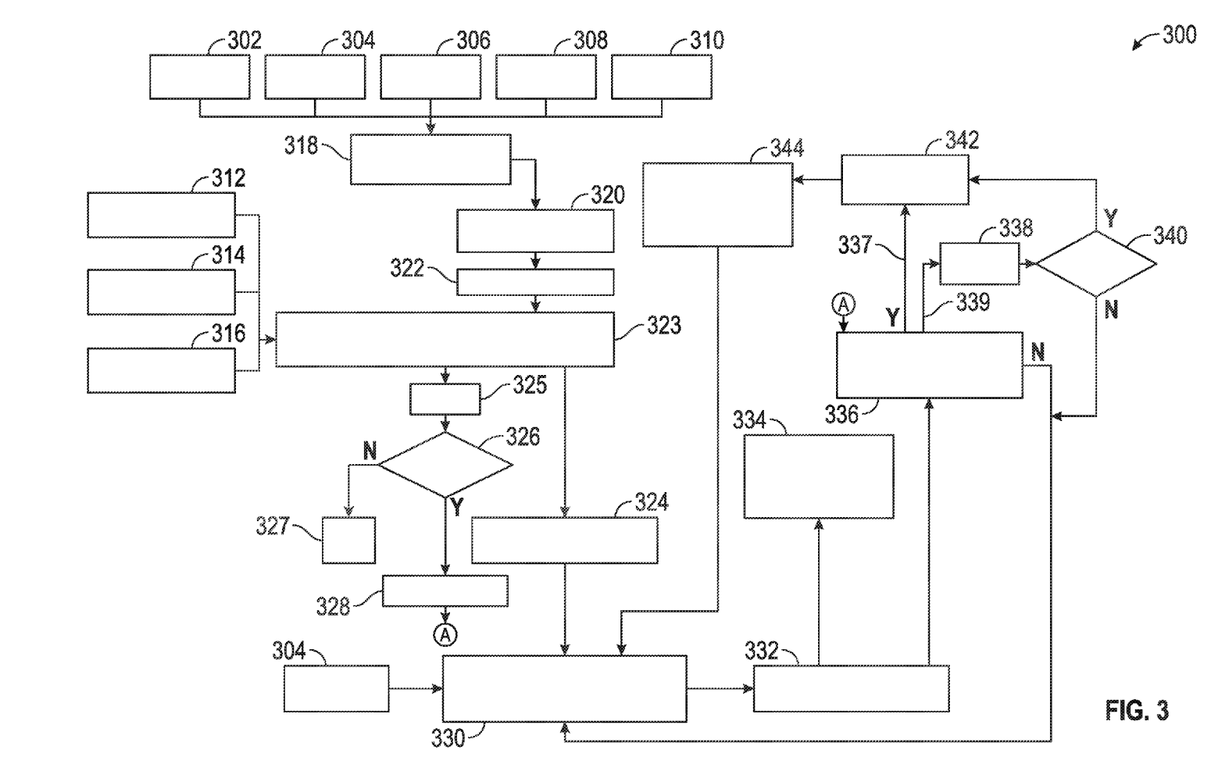
FIG. 3 is a flowchart of a process for managing an RESS, and that can be used in conjunction with the vehicle of FIG. 1 and the control system of FIGS. 1 and 2, in accordance with an exemplary embodiment.

FIG. 3 is a flowchart of a process 300 for managing an RESS, in accordance with an exemplary embodiment. The process 300 can be used in connection with the vehicle 100 of FIG. 1, the RESS 122 of FIG. 1, and the control system 170 of FIGS. 1 and 2, in accordance with an exemplary embodiment. The process 300 is also discussed below in conjunction with FIG. 4, which includes an illustration of exemplary steps in the process 300. The process 300 is preferably performed continuously at vehicle key-off and while the vehicle is keyed off.

As used throughout this Application, a vehicle "key off" occurs when the driver is turning off the key or "ignition" of the vehicle or is otherwise powering down the vehicle, or at least a propulsion feature of the vehicle (e.g., if the driver has parked the vehicle and is preparing to leave the vehicle). Also as used throughout this Application, a vehicle "key on" occurs when the driver is turning on the key or "ignition" of the vehicle or is otherwise powering up the vehicle, or at least a propulsion feature of the vehicle (e.g., if the driver has returned to the vehicle and is ready to drive somewhere). Also as used throughout this Application, a "vehicle drive" (or "ignition cycle") begins at "key on" and ends at "key off", and thus represents the driver driving the vehicle to a destination.

As depicted in FIG. 3, an ambient temperature is obtained (step 302). The ambient temperature preferably comprises a temperature just outside the vehicle. In one embodiment, the ambient temperature is measured by the ambient temperature sensor 210 of FIG. 2 and provided therefrom to the processor 220 of FIG. 2 at vehicle key-off for processing.

In addition, an RESS temperature is obtained (step 304). The RESS temperature preferably comprises a temperature inside a high voltage vehicle battery, such as the RESS 122 of FIG. 1. In one embodiment, the RESS temperature is measured by the RESS temperature sensor 212 of FIG. 2 at vehicle key-off and provided therefrom to the processor 220 of FIG. 2 for processing.

In certain embodiments, a solar load value is also obtained (step 306). The solar load preferably comprises a measure of an amount of sunlight in contact with the vehicle, which may be indicative of whether the vehicle is outside or instead inside such as in a garage, and so on. In one embodiment, the solar load value is measured by the solar load sensor 214 of FIG. 2 at vehicle key-off and provided therefrom to the processor 220 of FIG. 2 for processing.

In addition, in certain embodiments, weather data is also obtained (step 308). The weather data preferably pertains to a geographic location in which the vehicle is presently located (for example, as determined by the processor 220 using information obtained from the transceiver 205 via a GPS device, or the like). The weather data is preferably obtained by the transceiver 205 of FIG. 2 (for example, via a weather service or other content provider) at vehicle key-off and provided therefrom to the processor 220 of FIG. 2 for processing.

Various driver inputs are also obtained. Specifically, in certain embodiments, the driver inputs include driver preferences as to RESS management and/or the types of alerts desired by the driver (step 310) (e.g., if the driver always wants to receive alerts in a certain manner or only under certain conditions, and/or if the driver has a preference as to how to receive such alerts, such as an identification of a mobile device held by the driver, or the like). In addition, in certain embodiments, the driver inputs also include a destination (step 312) and estimated time of departure (step 314) for the next vehicle drive when the vehicle is keyed back on again. The driver inputs are preferably received from the driver via the user interface 207 of FIG. 2, for example from a vehicle navigation system, at or around the time of the key-off of the vehicle.

A calibrated soak time alert threshold is obtained (step 316). In one embodiment, the calibrated soak time threshold comprises an amount of time, such that if the RESS is "soaked" (e.g., in which the vehicle is keyed off in a non-propulsion mode while the RESS is not plugged in) for this amount of time, an alert for the driver is desired. In certain embodiments, the threshold of step 316 is stored in the memory 22 of FIG. 2 as one of the stored values 232 thereof. In certain other embodiments, the threshold of step 316 is provided by the driver as part of the driver inputs, for example of step 310. In one embodiment, if no inputs are received from the driver or customer, then the threshold of step 316 is set to a value such that an alert will be automatically provided to the driver or customer when it is believed that a significant degradation in range or acceleration will occur (i.e. before the set amount of time). By way of an illustrative example, if the driver or customer indicates that he or she is expected to be away from the vehicle for six hours (so that the vehicle will be turned off for six hours), and if the RESS would be expected to have significantly degraded performance (such that driving of the vehicle may be adversely impacted) in less than six hours, then an alert would be sent to the driver or customer. Further, by way of example, if the driver or customer does not set an alert time (e.g., if the driver or customer does not provide an indication of the time in which the driver or customer is expected to return to the vehicle/turn the vehicle on), and the threshold of step 316 is set to six hours automatically (e.g., as a default), then an alert would be provided to the driver or customer any time that the reduced performance is predicted prior to the expiration of the six hours. In other words, if the driver or customer is informed that if he or she does not return and start the vehicle until after the alert is provided, then the vehicle will likely function differently after it is turned back on.

The information from steps 302-308 (namely, the ambient temperature, RESS temperature, solar load, and weather data) are used as inputs for a RESS predictive model for analysis of possible RESS degradation (step 318). Specifically, in one embodiment, the processor 220 of FIG. 2 runs the RESS predictive model using the ambient temperature, RESS temperature, solar load, and weather data as inputs to estimate the resulting degradation of the RESS over time, during vehicle key-off while the RESS is not plugged in, as a result of exposure to these conditions. In one embodiment, the processor 220 of FIG. 2 uses a look-up table that is stored in the memory 222 as stored values 232 therein. The look-up table provides various RESS degradation amounts (for example, percentage degradation) shown by experimental results to be likely to occur for various measures of ambient temperature, RESS temperature, solar load, and weather conditions. It will be appreciated that in certain embodiments only a subset of these parameters may be utilized (for example, in one embodiment ambient temperature and RESS temperature may be used but not solar load and/or weather data, and so). It will also be appreciated that in certain embodiments algorithms and/or mathematical equations may be utilized instead of, or in addition to, look up tables.

The predictive thermal model determines a unit of time after which significant degradation is likely to occur under the specific conditions reflected in the information from steps 302-308 during key-off while the RESS is not plugged in (step 320). In one embodiment, the unit of time of step of step 320 comprises an amount of time after which, under these conditions, a power of the RESS is expected to fall below a certain predetermined threshold. In another embodiment, the unit of time of step of step 320 comprises an amount of time after which, under these conditions, a range (i.e., a distance likely to be attained by the vehicle via RESS power following the vehicle soak) is expected to fall below a certain predetermined threshold. In certain embodiments, the thresholds may include a mileage, or fuel efficiency, requirement (e.g., the threshold may correspond to any time the mileage is reduced below seventy percent, in one exemplary threshold). In certain other examples, the thresholds could be set as an acceleration threshold. For example, in one such embodiment, the threshold refers to a vehicle acceleration value such that it would take the vehicle longer than seventeen seconds to accelerate from zero miles per hour to sixty miles per hour.

A notification is provided with respect to the unit of time from step 320 (step 322). Specifically, in one embodiment, the processor 220 of FIG. 2 instructs the notification unit 208 of FIG. 2 to provide audio and/or visual notifications as to the unit of time. For example, such an alert may provide (either verbally and/or visually) at key-off as follows: "Warning: Vehicle may be unable to start in X hours due to cold temperature." In certain embodiments, the alert may be provided wirelessly to a driver's smart phone, computer, and/or other electronic device. Upon receiving the alert, the driver may then decide to take one or more actions, such as finding a place to plug in the RESS, start the new vehicle driver earlier, or the like.

A determination is made as to whether the unit of time of step 320 is less than the time until the next scheduled vehicle departure from step 314 or the soak time warning threshold of step 316 (step 323). This determination is preferably made by the processor 220 of FIG. 2.

If either the unit of time of step 320 is less than the time until the next scheduled vehicle departure from step 314 or the soak time warning threshold of step 316, or both, then an alert is provided (step 324). Specifically, in one embodiment, the processor 220 of FIG. 2 instructs the notification unit 208 of FIG. 2 to provide audio and/or visual notifications regarding this determination. For example, such an alert may provide (either verbally and/or visually) at key-off as follows: "Warning: Vehicle may be unable to start at X o'clock due to cold temperature." The process then proceeds to step 330, discussed further below. In certain embodiments, the alert may be provided wirelessly to a driver's smart phone, computer, and/or other electronic device. Upon receiving the alert, the driver may then decide to take one or more actions, such as finding a place to plug in the RESS, start the new vehicle driver earlier, or the like.

Conversely, if the unit of time of step 320 is greater than or equal to the time until the next scheduled vehicle departure from step 314 and is also greater than or equal to the soak time warning threshold of step 316, then a calculation is made as to a reduced range that is expected for the vehicle due to the RESS degradation as determined from the predictive thermal model (i.e., the amount of distance that the vehicle is expected to be able to travel when powered by the RESS in the partially degraded state). This determination is preferably made by the processor 220 of FIG. 2. If it is determined in step 326 that the range of step 325 is greater than the distance to the destination of step 312 by a sufficient margin for error, then the process ends (step 327).

Conversely, if it is determined that in step 326 that the range of step 325 is less than the distance to the destination of step 312 (or is close enough to the distance such that there would be little margin for error, for example if the range of step 325 would be less than the distance to the destination of step 312 if the time of departure were delayed by a predetermined amount, or the like), then an alert is provided (step 328). Specifically, in one embodiment, the processor 220 of FIG. 2 instructs the notification unit 208 of FIG. 2 to provide audio and/or visual notifications regarding the possible range issue. For example, such an alert may provide (either verbally and/or visually) at key-off as follows: "Warning: Vehicle may not be able to travel to desired destination with a departure at X o'clock". In certain embodiments, the alert may be provided wirelessly to a driver's smart phone, computer, and/or other electronic device. Upon receiving the alert, the driver may then decide to take one or more actions, such as finding a place to plug in the RESS, start the new vehicle driver earlier, or the like. The process then proceeds to step 336, described further below, in which range is optimized via possible warming of the RESS.

With reference again to steps 323 and 324, if it is determined in step 323 that the unit of time of step 320 is less than the time until the next scheduled vehicle departure from step 314, then (along with providing the alert of step 324) a timer runs while the temperature of the RESS continues to be monitored (step 330). Determinations are continually made (preferably by the processor 220 of FIG. 2) as to whether the amount of time elapsed has exceeded the threshold of step 316 or the RESS temperature has fallen below a predetermined threshold (step 332). If either (or both) of these conditions are satisfied, then the process proceeds to step 336, discussed directly below.

During step 336, a determination is made, in light of the potential issues from the determinations of step 326 and/or 332, as to whether a net range gain is attainable for the vehicle by warming the RESS. Specifically, a determination is made as to whether an expected range gain from having a warmer RESS would be greater than an expected range loss from using RESS energy to warm the RESS. This determination is preferably made by the processor 220 of FIG. 2 in optimizing the range (or distance in which the vehicle may be propelled using RESS power under present conditions). If the determination of step 336 is "no", then the process returns to step 330. Conversely, if the determination of step 336 is "yes", then the process proceeds instead to step 338 and/or step 342 along a first path 337 or a second path 339, as discussed below.

In the first path 337, upon a "yes" determination in step 336, the process proceeds directly to step 342, as the RESS is warmed to a predetermined target temperature. In one embodiment, the predetermined target temperature is dependent upon the chemistry of the RESS. For example, in one embodiment, RESS would be warmed until the vehicle operates in a way that is consistent for the customer. For example, if the vehicle regularly accelerates from zero miles per hour to sixty miles per hour in nine seconds, then the RESS would be warmed until the vehicle is again cable of accelerating from zero miles per hour to sixty miles per hour in nine seconds, and so on. In one such embodiment, the warming of the RESS is provided by instructions by the processor 220 for providing warming for fluid flowing to the RESS. For example, in one such embodiment, a liquid cooled pack is to run the fluid through a heater. The heater works through resistive heating from high voltage (HV) electricity coming from the RESS. The heated liquid is then circulated through the pack to warm it up. For an air cooled/heated RESS the air can be heated using resistive heat and then distributed through the pack. A new, updated range estimate is then provided for the driver as the monitoring system is re-started (step 344), preferably by the processor 220 of FIG. 2, and the process returns to step 330 in a new iteration.

In the second path 339, the RESS warming of step 324 is performed only if approved by the driver. Specifically, a request for input is made for the driver as to whether the driver wishes for the warming to occur (step 338). The request is preferably made via instructions provided by the processor 220 via the user interface 207 of FIG. 2. In one such embodiment, the request for input is made via a screen within the vehicle. In another embodiment, the request is made via a wireless device of the driver (for example, a computer, smart phone, or the like). A determination is then made, preferably by the processor 220 of FIG. 2, as to whether the requested input indicates that warming action is desired by the driver (step 340). If the determination of step 340 is "yes", then the process proceeds to step 342, as the RESS is warmed accordingly. Conversely, in this embodiment, if the determination of step 340 is "no", then the process returns directly to step 330.

In one embodiment, the selection of the first path 337 versus the second path 339 depends on the initial driver inputs received in step 310. For example, if the driver indicates in step 310 that he or she wishes to optimize range without notification as a general matter, then the first path may be selected. Conversely, also by way of example, if the driver indicates in step 310 that he or she wishes to be notified first before range optimization is performed, then the second path 339 may be selected instead. In other embodiments, the first path 337 or the second path 339 may be pre-selected at an earlier time, and/or the process may utilize the first path 337 or the second path 339 automatically in yet other embodiments.

Figure 4:
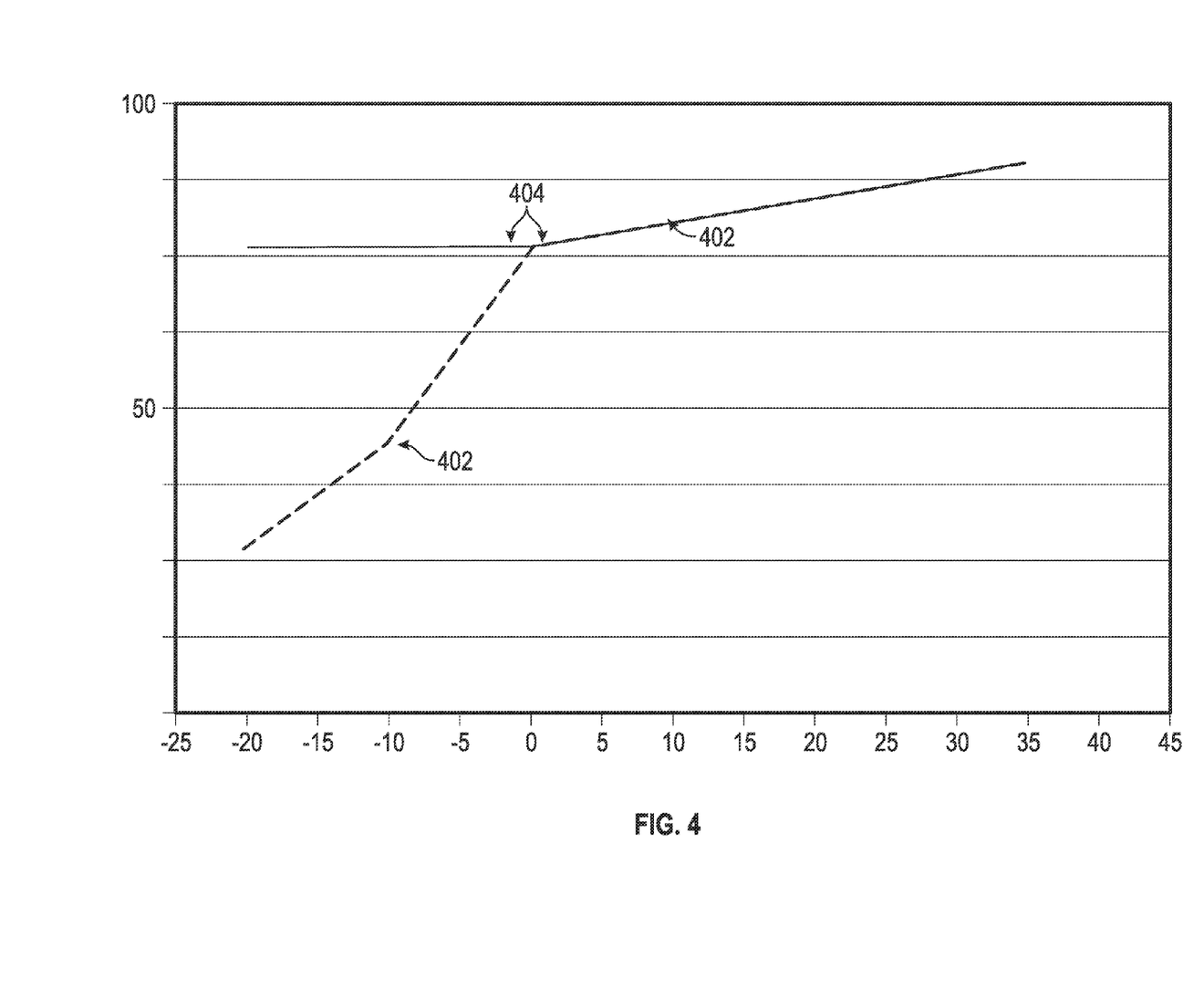
FIG. 4 is a graphical representation of certain steps of the processor of FIG. 3, in accordance with an exemplary embodiment.

Turning now to FIG. 4, a graphical representation is shown that illustrates that potentially increased range that may result for the RESS and the vehicle using the process 300 of FIG. 4. In FIG. 4 the x-axis represents temperature (in degrees Celsius), and the y-axis represents range (in miles). In one embodiment, the range will follow similar curves for long and short range vehicles. As shown in FIG. 4, the range may decrease significantly as the RESS temperature decreases if the RESS is not plugged in after key-off, as represented by region 402. However, if appropriate actions are taken to help maintain RESS temperature (such as warming the RESS or other action taken by the driver after receiving an alert, such as plugging in the RESS or starting the next vehicle driver earlier), then the range would be expected to remain more constant at colder temperatures, as represented by region 404.

Accordingly, methods and systems are provided for managing degradation for RESS devices in vehicles, such as battery electric vehicles, due to extreme temperatures. The disclosed methods and systems provide actions (such as driver alerts and/or RESS warming) as appropriate, for example to optimize the range of the RESS for the vehicle and/or to help ensure that the RESS is ready to function as needed during key-on.

It will be appreciated that the vehicle of FIG. 1, and/or the systems of FIGS. 1 and 2, including without limitation the RESS 122 and the control system 170, and/or components thereof, may vary in different embodiments. It will also be appreciated that various steps of the process 300 described herein in connection with FIG. 3 may vary in certain embodiments. It will similarly be appreciated that various steps of the process 300 described herein in connection with FIG. 3 may occur simultaneous with one another, and/or in a different order as presented in FIG. 3 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method comprising:
    obtaining an ambient temperature for a vehicle having a rechargeable energy storage system (RESS);
    obtaining a temperature of the RESS;
    estimating an expected degradation of the RESS after vehicle key-off based at least in part on the ambient temperature and the RESS temperature;
    calculating a first value of a range of the RESS, based at least in part on the expected degradation, if warming of the RESS is not implemented during vehicle key-off;
    calculating a second value of the range of the RESS based on a modified value of expected degradation if warming of the RESS is implemented during vehicle key-off; and
    taking an action based at least in part on the first value of the range and the second value of the range.

2. The method of claim 1, further comprising:
    calculating an amount of time after which the RESS is expected to degrade by at least a predetermined amount, based at least in part on the ambient temperature and the RESS temperature;
    wherein the step of taking the action comprises providing an alert as to the calculated amount of time.

3. The method of claim 1, further comprising:
    receiving an input as to a future time in which a driver is intending to initiate a vehicle drive;
    wherein the step of taking the action comprises taking the action if the expected degradation at the future time is greater than a predetermined threshold.

4. The method of claim 1, further comprising:
    receiving an input as to a destination for a next vehicle drive;
    calculating a distance to the destination; and
    calculating an expected range of the RESS based on the expected degradation;
    wherein the step of taking the action comprises taking the action if the expected range is less than the distance.

5. The method of claim 1,
    wherein the step of taking the action comprises warming the RESS if the second value of the range is greater than the first value of the range.

6. The method of claim 1, further comprising:
    requesting input from a driver of the vehicle pertaining to the first value, the second value, or both;
    wherein the step of taking the action comprises warming the RESS if requested by the driver.

7. The method of claim 1, wherein the step of taking the action comprises:
    providing an alert to a driver of the vehicle at vehicle key-off on a vehicle screen.

8. The method of claim 1, wherein the step of taking the action comprises:
    providing an alert to a driver of the vehicle after vehicle key-off via a wireless communication to an electric device of the driver.

9. The method of claim 1, further comprising:
    obtaining a solar load value for the vehicle;
    wherein the step of taking the action comprises taking the action based on the expected degradation of the RESS after vehicle key-off based at least in part on the ambient temperature, the RESS temperature, and the solar load value.

10. The method of claim 1, further comprising:
    obtaining weather conditions for a location in which the vehicle is disposed during vehicle key-off;
    wherein the step of taking the action comprises taking the action based on the expected degradation of the RESS after vehicle key-off based at least in part on the ambient temperature, the RESS temperature, and the weather conditions.

11. A system comprising:
    a first sensor configured to measure an ambient temperature for a vehicle having a rechargeable energy storage system (RESS);
    a second sensor configured to measure a temperature of the RESS; and
    a processor coupled to the first sensor and the second sensor and configured to at least facilitate:
        estimating an expected degradation of the RESS after vehicle key-off based at least in part on the ambient temperature and the RESS temperature;
        calculating a first value of a range of the RESS, based at least in part on the expected degradation, if a modification of the temperature of the RESS is not implemented during vehicle key-off;
        calculating a second value of the range of the RESS based on a modified value of expected degradation if the modification of the temperature of the RESS is implemented during vehicle key-off; and
        taking an action based at least in part on the first value of the range and the second value of the range.

12. The system of claim 11, wherein the processor is further configured to at least facilitate:
    calculating an amount of time after which the RESS is expected to degrade by at least a predetermined amount, based at least in part on the ambient temperature and the RESS temperature; and
    providing an alert as to the calculated amount of time.

13. The system of claim 11, wherein the processor is further configured to at least facilitate:
    receiving an input as to a future time in which a driver is intending to initiate a vehicle drive; and
    taking the action if the expected degradation at the future time is greater than a predetermined threshold.

14. The system of claim 11, wherein the processor is further configured to at least facilitate:
- receiving an input as to a destination for a next vehicle drive;
- calculating a distance to the destination;
- calculating an expected range of the RESS based on the expected degradation; and
- taking the action if the expected range is less than the distance.

15. The system of claim 11, wherein the processor is further configured to at least facilitate:
- calculating the first value of a range of the RESS, based at least in part on the expected degradation, if warming of the RESS is not implemented during vehicle key-off;
- calculating the second value of the range of the RESS based on a modified value of expected degradation if warming of the RESS is implemented during vehicle key-off; and
- warming the RESS if the second value of the range is greater than the first value of the range.

16. The system of claim 11, wherein the processor is further configured to at least facilitate:
- calculating the first value of a range of the RESS, based at least in part on the expected degradation, if warming of the RESS is not implemented during vehicle key-off;
- calculating the second value of the range of the RESS based on a modified value of expected degradation if warming of the RESS is implemented during vehicle key-off;
- requesting input from a driver of the vehicle pertaining to the first value, the second value, or both; and
- warming the RESS if requested by the driver.

17. The system of claim 11, further comprising:
- a third sensor configured to obtain a solar load value for the vehicle;
- wherein the processor is further configured to at least facilitate taking the action based on the expected degradation of the RESS after vehicle key-off based at least in part on the ambient temperature, the RESS temperature, and the solar load value.

18. The system of claim 11, wherein the processor is further configured to at least facilitate:
- obtaining weather conditions for a location at which the vehicle is disposed during vehicle key-off; and
- taking the action based on the expected degradation of the RESS after vehicle key-off based at least in part on the ambient temperature, the RESS temperature, and the weather conditions.

19. The system of claim 11, wherein the processor is further configured to provide an alert to a driver at vehicle key-off with respect to the expected degradation.

20. A vehicle comprising:
- a drive system comprising a rechargeable energy storage system (RESS); and
- a control system comprising:
  - a first sensor configured to measure an ambient temperature for the vehicle;
  - a second sensor configured to measure a temperature of the RESS; and
  - a processor coupled to the first sensor and the second sensor and configured to at least facilitate:
  - receiving an input as to a future time in which a driver is intending to initiate a beginning of a vehicle drive in which the vehicle is to be operated in a propulsion mode;
  - estimating an expected degradation of the RESS after vehicle key-off for the future time based at least in part on the ambient temperature and the RESS temperature; and
  - taking an action if the expected degradation for the future time is greater than a predetermined threshold.

* * * * *